(12) United States Patent
McIvor

(10) Patent No.: US 12,212,265 B2
(45) Date of Patent: Jan. 28, 2025

(54) CONTROL DEVICE AND PUMP APPARATUS

(71) Applicant: Clearwater Controls Limited, Grangemouth (GB)

(72) Inventor: Graham McIvor, Fife (GB)

(73) Assignee: CLEARWATER CONTROLS LIMITED, Edinburgh (GB)

( * ) Notice: Subject to any disclaimer, the term of this patent is extended or adjusted under 35 U.S.C. 154(b) by 188 days.

(21) Appl. No.: 15/017,987

(22) Filed: Feb. 8, 2016

(65) Prior Publication Data

US 2016/0156303 A1 Jun. 2, 2016

Related U.S. Application Data

(63) Continuation of application No. 14/000,086, filed as application No. PCT/GB2012/051083 on May 16, 2012, now abandoned.

(30) Foreign Application Priority Data

May 17, 2011 (GB) .................................... 1108171
Dec. 12, 2011 (GB) .................................... 1121293

(51) Int. Cl.
*H02P 29/028* (2016.01)
*F04B 49/02* (2006.01)
(Continued)

(52) U.S. Cl.
CPC ............ *H02P 29/028* (2013.01); *F04B 49/02* (2013.01); *F04D 7/045* (2013.01);
(Continued)

(58) Field of Classification Search
CPC .. F04D 15/0016; F04D 29/2283; F04D 7/045; F04D 15/0027; F04D 15/0077;
(Continued)

(56) References Cited

U.S. PATENT DOCUMENTS 3,940,668 A * 2/1976 Apsit ..................... H02P 1/32
310/99
4,341,504 A * 7/1982 Hignutt ................. F04B 49/04
417/38
(Continued)

FOREIGN PATENT DOCUMENTS

DE 1111508 7/1961
DE 19858610 C1 2/2001
(Continued)

OTHER PUBLICATIONS

Grundfosliterature-2261665, Author/Publisher Grundfos Corporation, Pertinent pp. 1 and 2 specifically.*
(Continued)

*Primary Examiner* — Essama Omgba
*Assistant Examiner* — Charles W Nichols
(74) *Attorney, Agent, or Firm* — Wasserbauer Law, LLC; Damian G. Wasserbauer, Esq.; Nicholas E. Blanton, Esq.

(57) ABSTRACT

This invention relates to programmable electronic device that prevents wastewater submersible and non-submersible pumps as well as viscous pumps from ragging therefore avoiding pump blockage. In one aspect the invention provides a pump apparatus comprising a pump and a control device for a pump, the pump being a mechanically switched pump such as a direct online/ star delta pump and capable of being operated in a forward and a reverse direction, the control device comprising: a monitoring mechanism to monitor the torque of the pump, a control mechanism to control the direction of the pump and being capable of selectively directing the pump to (i) stop, (ii) operate in a reverse and (iii) operate in a forward direction; wherein the control mechanism is adapted to control the pump to do at least one of (a) stop and (b) operate in a reverse direction when the monitoring mechanism detects a pre-determined value in the torque of the pump. The device is programmed (Continued)

to provide anti-ragging functionality whilst providing traditional electrical pump protections. The physical size of the device has been minimised which enables great use and, significantly, retro-fitting of the product.

17 Claims, 4 Drawing Sheets

(51) Int. Cl.
  *F04D 7/04* (2006.01)
  *F04D 15/00* (2006.01)
  *G05D 7/06* (2006.01)
  *H02P 29/032* (2016.01)
(52) U.S. Cl.
  CPC ....... *F04D 15/0066* (2013.01); *G05D 7/0676* (2013.01); *H02P 29/032* (2016.02)
(58) Field of Classification Search
  CPC .. F04D 15/02; F04D 15/0236; F04D 15/0245; F04D 15/0254; F04D 15/0281; F04D 15/0066; F04B 17/03; F04B 49/02; F04B 49/06; F04B 49/10; F04B 2201/1202; F04B 2203/0201; F04B 2203/0207; H02P 3/20; H02P 29/028; H02P 29/032; G05D 7/0676
  USPC .................................... 417/53, 217, 315, 325
  See application file for complete search history.

(56) References Cited

U.S. PATENT DOCUMENTS

| | | | | |
|---|---|---|---|---|
| 4,560,110 | A * | 12/1985 | Burda | B02C 18/24 241/32 |
| 5,681,509 | A | 10/1997 | Bailey | |
| 6,254,353 | B1 | 7/2001 | Polo et al. | |
| 6,379,109 | B1 * | 4/2002 | Senior, Jr. | B01F 3/04773 210/219 |
| 6,463,956 | B2 | 10/2002 | Walker | E03B 7/04 137/563 |
| 6,481,973 | B1 * | 11/2002 | Struthers | F04D 7/045 417/36 |
| 7,080,508 | B2 | 7/2006 | Stavale et al. | |
| 8,436,559 | B2 * | 5/2013 | Kidd | F17D 3/01 318/52 |
| 2004/0213676 | A1 * | 10/2004 | Phillips | F04B 17/03 417/44.11 |
| 2005/0155922 | A1 | 7/2005 | Tormaschy et al. | |
| 2010/0034665 | A1 * | 2/2010 | Zhong | F04D 15/0066 417/42 |
| 2010/0166569 | A1 * | 7/2010 | Andy | F04D 15/0066 417/22 |
| 2013/0323084 | A1 | 12/2013 | McIvor | |

FOREIGN PATENT DOCUMENTS

| | | |
|---|---|---|
| EP | 0619431 | 10/1994 |
| EP | 2025943 | 2/2009 |
| EP | 2025943 A2 | 2/2009 |
| GB | 2120565 | 12/1983 |
| GB | 1121293.3 | 3/2012 |
| GB | 2487623 | 8/2012 |
| GB | 1404957.1 | 9/2012 |
| GB | 150468.08 | 9/2015 |
| JP | S60261595 | 12/1985 |
| JP | H07124588 | 5/1995 |
| JP | 08294641 A | 11/1996 |
| JP | H11216487 | 8/1999 |
| JP | 2004308555 A * | 11/2004 |
| JP | 2011240230 | 12/2011 |
| WO | 2006136202 | 12/2006 |
| WO | 2012156726 | 9/2012 |

OTHER PUBLICATIONS

JP-H08294641-A, English Translation.*
Declaration of Brien N. Gidlow and associated references, provided on Aug. 10, 2015 during prosecution of U.S. Appl. No. 14/000,086.
The Shark 840 Grinder Pump, informational brochure, distributed by Zoeller Company, copyright 2014.
"Report by Scottish Water on Intelligent Pump Control Trial at Levenhall Sewage Pumping Station" by Graeme Moore, dated Feb. 15, 2011, extracted from Control Techniques, Press Release on Aug. 7, 2013, twelve pages.
Website with video at "http://www.emersonindustrial.com/en-US/controltechniques/products/industrysolutions/ipc/Pages/ipcanimation.aspx" dated Aug. 7, 2013, one page.
Grundfosliterature—2261665 Published by Grundfos Corporation, see pp. 1 and 2.
"Sewage blockages cut by pump control," WorldPumps.com, Jul. 21, 2009 https://www.worldpumps.com/content/features/sewage-blockages-cut-by-pump-control.

* cited by examiner

CONTROL DEVICE AND PUMP APPARATUS

CROSS REFERENCE TO RELATED APPLICATIONS

This application is a continuation of, and claims priority under 35 U.S.C. § 120 to, U.S. Nonprovisional patent application Ser. No. 14/000,086, filed on Aug. 16, 2013, which was a 35 U.S.C. § 371 application of Patent Cooperation Treaty Application No. PCT/GB2012/051083 filed May 16, 2012, which claimed priority to Great Britain Patent Application No. 1108171.8, filed on May 17, 2011, and to Great Britain Patent Application No. 1121293.3, filed on Dec. 12, 2011, the disclosure of each of which is incorporated herein by reference.

This invention relates to a control device for pumps and to a pump apparatus comprising the control device.

Pump blockages contribute a significant cost to water authorities operational spend by having to attend site to unblock to avoid floods to the local area and associated damage of reputation if they occur.

It would be beneficial to mitigate the amount of maintenance used for certain pumps, especially those pumping wastewater.

Moreover, it would be beneficial to improve the power efficiency of pumps.

An object of the present invention is to mitigate the maintenance requirements and/or improve the power efficiency of pumps.

U.S. Pat. No. 6,254,353 discloses a method and apparatus for controlling operation of a submersible pump and discloses a variable speed pump, evidenced by FIG. 2 which shows a rectifier circuit and a 3 phase H-bridge.

According to a first aspect of the present invention, there is provided a pump apparatus comprising a pump and a control device for a pump, the pump being a mechanical switched pump and capable of being operated in a forward and a reverse direction, the control device comprising: a monitoring mechanism to monitor the torque of the pump, a control mechanism to control the direction of the pump and being capable of selectively directing the pump to (i) stop (ii) operate in a reverse direction and (iii) operate in a forward direction; wherein the control mechanism is adapted to control the pump to do at least one of (a) stop and (b) operate in a reverse direction when the monitoring mechanism detects a pre-determined value in the torque of the pump.

Thus the present invention claims a mechanically switched pump, rather than a relatively complex variable speed pump shown in U.S. Pat. No. 6,254,353. Moreover, the present invention monitors the torque of the pump whereas U.S. Pat. No. 6,254,353 monitors the frequency of the pump (as detailed in e.g. FIG. 1 1 , FIG. 13 and claim 1). The inventor of the present invention has discovered an important benefit of such an approach. The present invention can detect when a pump is labouring (but the output is not necessarily changing) because of a blockage starting to occur, and can take remedial action at this early stage. In contrast relying on monitoring the frequency of a pump will only suggest a blockage when the pump is unable (not merely labouring) to maintain the desired frequency, which will often be when the blockage is more severe. Embodiments of the present invention therefore can take remedial action at an earlier stage of a blockage, which is more effective at clearing the blockage and/or minimising the time taken to clear the blockage.

A mechanical switched pump is one which is activated by a mechanical switch and so can take up the forward, stop, or reverse modes. Suitable mechanically switched pumps include direct online pumps or Star/Delta pumps.

In contrast, soft start and Variable Speed Drive (VSD) pumps can ramp up gradually the speed of the pump and are not mechanically switched pumps.

The pump may have a power rating less than 25 kw, optionally less than (but not totally restricted to less than) 9 kW, sometimes less than 7.5 kw.

According to a second aspect of the present invention, there is provided a pump apparatus comprising a pump and a control device for a pump, the pump having a power rating of less than 25 kw, optionally less than 9 kW, more optionally less than 7.5 kw and capable of being operated in a forward and a reverse direction, the control device comprising: a monitoring mechanism to monitor the torque of the pump, a control mechanism to control the direction of the pump and being capable of selectively directing the pump to (i) stop (ii) operate in a reverse direction and (iii) operate in a forward direction; wherein the control mechanism is adapted to control the pump to do at least one of (a) stop and (b) operate in a reverse direction when the monitoring mechanism detects a pre-determined value in the torque of the pump.

The pump according to the second aspect of the invention is typically a mechanically switched pump.

According to a third aspect of the present invention there is provided a method of fitting a control device as herein described to a pump as herein described. Indeed, the present invention allows control devices to be retro-fitted to pumps in situ.

The response of the control mechanism when the monitoring mechanism detects a pre-determined value in the torque of the pump is preferably initially to control the pump to (a) stop. That is, power to the pump is stopped and the pump is allowed to coast to a rest. Preferably the pump is then put into a reverse direction. The pump may be stopped again and put into a forward direction.

Preferably the control mechanism is adapted to direct the pump into a series of reverse and forward cycles normally with a user adjustable stopping period of 0-30 s but not limited thereto between direction changes. This allows the pump to come to a rest before direction change and so reduces stress on the pumps.

More preferably the control mechanism is adapted to direct the pump into a series of reverse and forward cycles (normally with said delays between forward and reverse directions) of the pump until a further pre-determined value of pump torque is reached. The first and second pre-determined values are often the same although may be different. Thus in use, when the torque is noted to be, for example, above a certain value, then the pump would be directed to a reverse and preferably to proceed through a series of reverse, then forward, then reverse directions, until the torque detected by the monitoring mechanism is below a pre-determined value or the number of clean attempts exceeds a predefined maximum attempts.

Typically each stage in the cycle (forward and reverse) lasts for 3 to 20 seconds.

The monitoring mechanism typically measures the torque of the pump by measuring the current at which the pump is operating. When the current is increased this is indicative of rag or blockage on the pump which is inhibiting its operation. Once the rag causes an increase in current above the pre-defined level, the control mechanism will proceed to reverse (preferably cycle from reverse forward and back with time delay between direction changes) to remove debris causing the rag.

As the current demanded by the motor is directly proportional to torque, the inventor considers this the most suitable variable to monitor. Nevertheless a torque instrument could be put on the motor's shaft in the well although this may have a slower reaction time and so is less preferred.

The monitoring mechanism may also be adapted to monitor the pump current with regard to potential overloading of the pump.

Standards for excess current being directed to pumps are often imposed by regulatory authorities to safeguard overheating. These limits, which depend on a number of different variables, can be stored by the device and the control mechanism may be adapted to control the pump or another device in response to an overload breaching a pre-determined safety level, which is indicative of the pump overheating. Other devices the control mechanism may control include alarms. Preferably the control device, comprising the components for monitoring the torque of the pump and the components adapted to monitor the potential overloading of the pump are provided on the same device.

Thus the monitoring mechanism to monitor the output of the pump and the monitoring mechanism to monitor the thermal stability of the pump may be provided on the same device.

Any feature of any aspect of the present invention may be combined with any other feature of any other aspect of the present invention.

The monitoring mechanism may also comprise a monitoring means to detect any sudden change or short circuit in the current supplied to the motor, and the control mechanism is normally adapted to suitably respond to such an event, for example by shutting down the pump.

The pump may be a pump for pumping viscous fluids such as sewage and sludge, wastewater, grit etc.

Preferably on start-up, the pump proceeds through a reverse and forward cycle. Preferably the pump starts at full power, without a restriction in power supplied, optionally with reverse and forward cycle immediately after start-up.

An advantage of certain aspect of the invention is that pump may be cleared of debris without manual intervention, reducing pump downtime and costs associated with pump maintenance.

A further advantage of certain embodiments of the invention is that the pumps may be more efficient because the rag on them may be cleared more frequently than using manual intervention.

A further advantage of certain embodiments of the invention is that the control device may be provided on a single device, thus saving space.

Moreover it is very useful to allow such a device to be retro-fitted, and certain embodiments benefit from this feature.

The cycle(s) of reverse and forward pumping actions described herein may be referred to as anti-ragging functionality.

The device may be programmed to provide anti-ragging functionality whilst providing traditional electrical pump protections. The physical size of the device has been minimised which enables greater use of the product. Preferably the size is less than 104 mmH×45 mmW×200 mmD.

The device is particularly useful for small to medium pumping stations, such as those operated with pumps having a power of less than 9 kW, optionally less than 7.5 kw.

Traditionally larger pumping stations would be controlled with Variable Speed Drives (VSD) which is less preferred to the smaller (<9 kW) mechanically switched pumps preferred in the present invention.

An advantage of certain embodiments of the invention is that the pump apparatus of the present invention may be less expensive to manufacture, compared with VSD devices, which may be ten times the cost of mechanical switching devices. Thus embodiments of the invention provide a benefit of having a responsive pump control without the expense of a VSD system. A benefit of certain embodiments is that this functionality is provided in the same device used to monitor the potential overloading of the pump apparatus and so additional functionality may be provided to the pump apparatus within the, often limited, confines of the existing pump apparatus.

Thus embodiments of the invention provide de-ragging functionality somewhat akin to VSD at a fraction of the cost therefore, making it more economical for smaller stations. Also, the device is preferably designed to be retro-fitted into existing stations and is physically much smaller (<250 cm2) than any VSD.

The device can be easily retro fitted into existing starter panels as it replaces thermal/electronic overload devices. The system monitors the current in real time and upon a slight over current can begin a de-ragging sequence.

The sequence is completely customisable and the event that triggers the sequence can be changed or more events can be added i.e. on each start event.

Pumps used in the present invention should be capable of being operated in the forward or reverse direction. This includes pumps where the existing control system only functions to direct them in a forward direction and a stop position and not a reverse direction.

BRIEF DESCRIPTION OF THE DRAWINGS

Embodiments of the present invention will now be described, by way of example only, with reference to the accompanying figures, in which.

DETAILED DESCRIPTION

Figure 2:
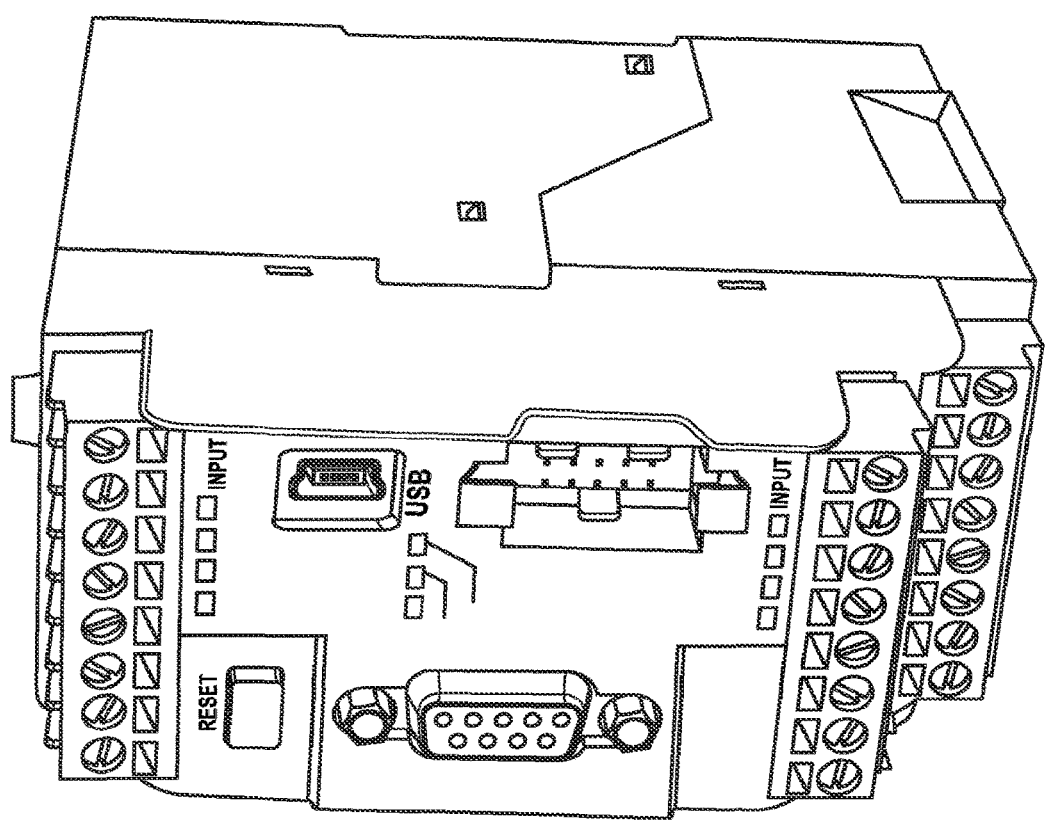
FIGS. 2 and 3 are views of an embodiment in accordance with the present invention.
Figure 3:
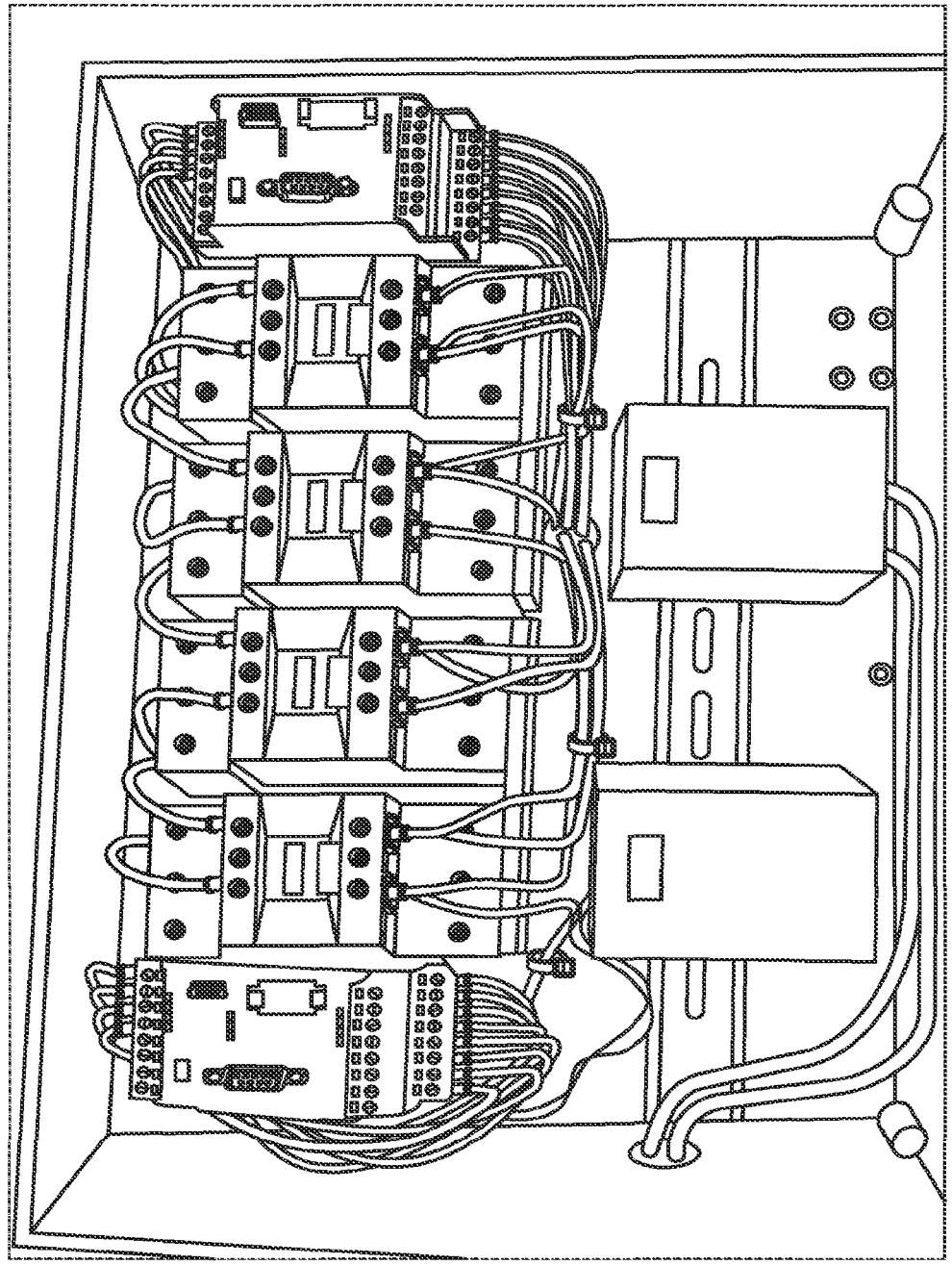

The device 10, shown in FIGS. 2-3, is a hardware and software solution. The device measures real time current on the three conductors supplying a pump via current transducers (CT's). From this current, the device knows the loading of the motor during operation.

During commissioning of the pump the low and high current consumptions are recorded. A set point of around 10% is added to the high level and 10% subtracted from the low level. These set points are entered into the device to provide the predetermined "activation level".

Figure 1:
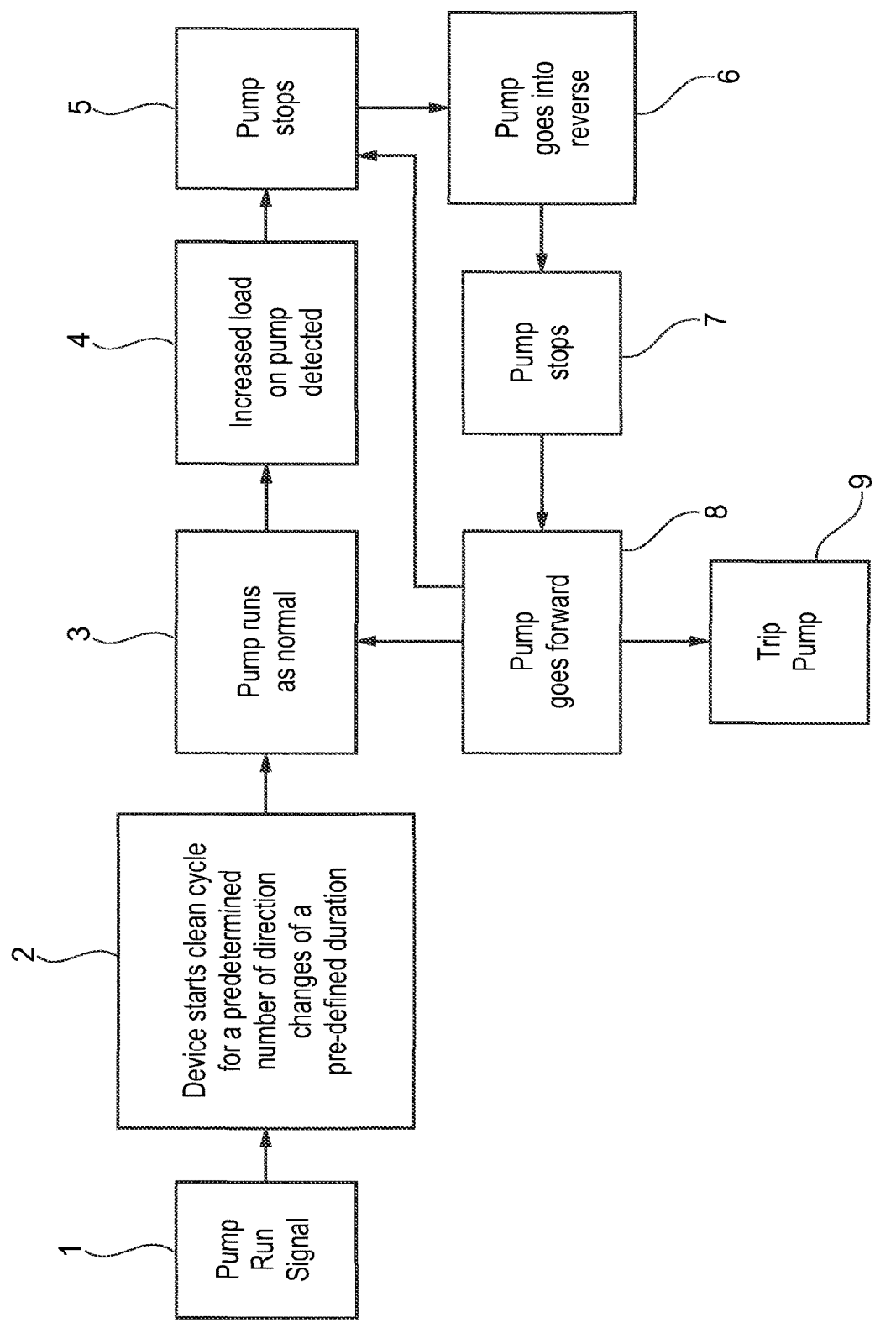
FIG. 1 is a flowchart showing the stages of a device in accordance with the present invention.

As shown in FIG. 1, the pump is first turned on 1 and it will run through a start-up clean cycle for a pre-determined number of direction changes of a pre-defined duration 2. The pump then runs as normal 3, until an increased load on the pump is detected 4 by the motor drawing a higher level of current. This is indicative of the motor's torque increasing because it is attempting to maintain speed against a larger force, such as ragging. The clean cycle then starts by cutting power to the pump, 5. Typically the inertia of the pump and the fluid continuing to pass therethrough will keep the pump running in the same direction for a short period of time after the power is cut—the pump will "coast" to a rest. Thus after the power is cut to the motor it will wait 5 for a pre-defined time A before progressing to the next step. The time A can be varied by the user and is typically larger for larger pumps.

After this time the pump goes into reverse, 6, also for a for pre-defined time B which may also be varied by the user. The pump stops again 7 by cutting power and allowing it to coast to a rest. After a further period of time A the pump goes into a forward direction for pre-defined time C.

The above clean cycle (steps 5 to 8) is repeated for pre-defined number of times, which again may be varied by the user. At this point the clean ends and the device has a number of options.

If the rag is cleared, indicated by a normal current being demanded by the motor in the forward direction, then it will resume pumping as normal, step 3. If not, the device will attempt to clean again by reverting to the clean cycle (steps 5 to 8). The device will continue on this cycle until a maximum number of clean cycles is met at which point it would trip the pump, 9.

The maximum number of cleans allowed counter will be reset after the pump has finished pumping.

Thus as noted above, when the pump is under or more likely above normal operation, if the "activation level" is met, a clean cycle is then initiated on the motor. The clean cycle is fully customisable but consists of but not limited to and not necessarily in the order of forward rotation for a user adjustable time, reverse rotation for user adjustable time. The number of direction changes and duration can be changed by the user. If the device is unable to return the pump to is original loading tolerance band after a user defined number of tries, the motor will trip an alarm.

As the real time current of the pump is monitored the device also acts as motor protection as it contains a thermal image algorithm of the motor. This will allow the device to act like a traditional motor thermal overload.

An advantage of certain embodiments of the present invention is that they provide an economical de-ragging solution for small to medium wastewater pumps where the unit detects a change in current and immediately reverses the pump to dislodged debris built up during normal flow.

Due to its physical size, the device of certain embodiments of the invention have been designed to be retro-fitted into existing pump control panels.

Figure 4:
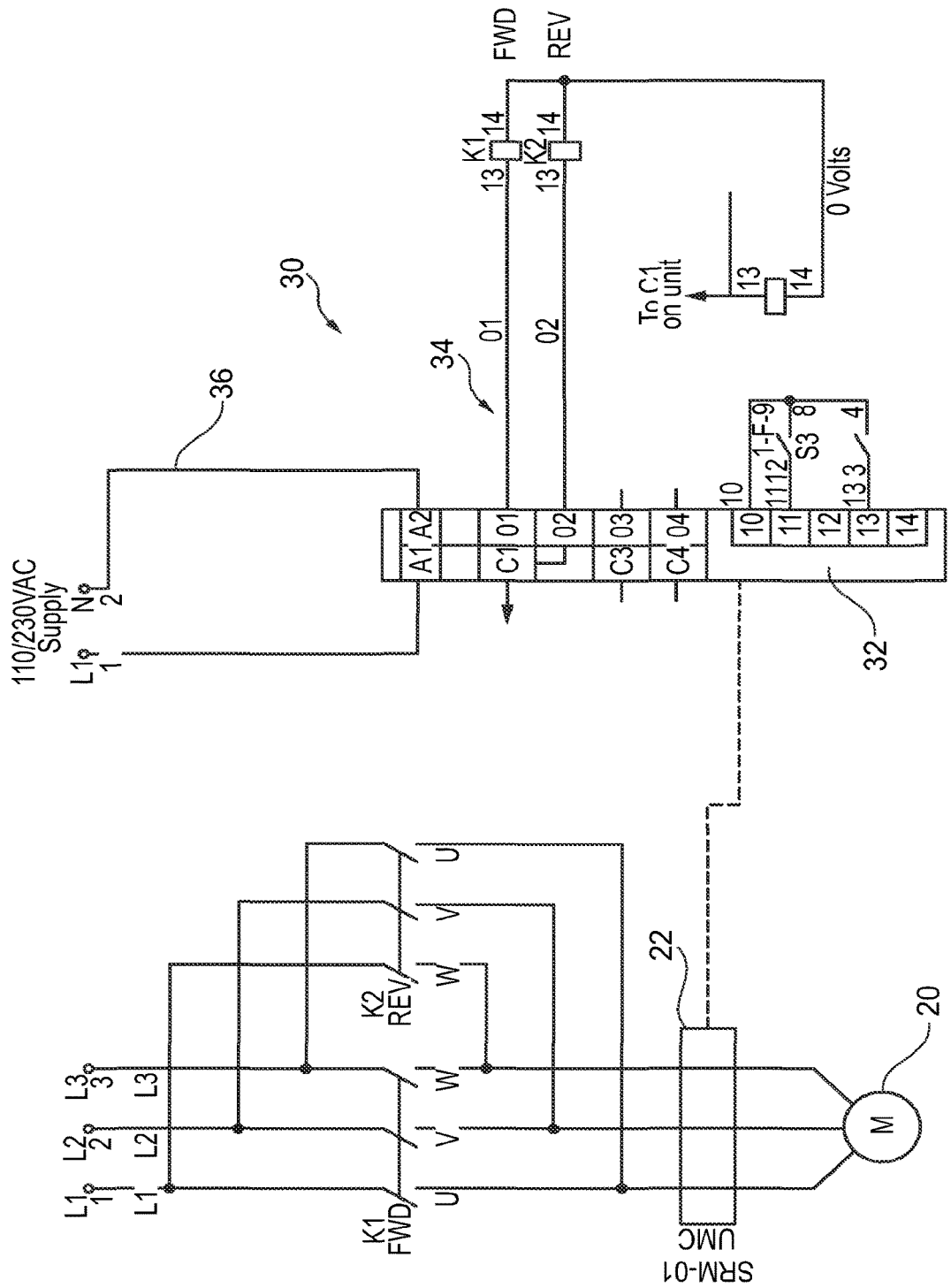
FIG. 4 is a circuit diagram indicating electrical connections and a typical retro-fit installation.

FIG. 4 shows a circuit diagram for the FIG. 1 embodiment and illustrates the ease at which the present device can be retrofitted to an existing pump. The pre-existing pump motor 20 is supplied by a three-phase power supply L1, L2, L3. A contactor K1 is provided to engage the motor 20 into a forward direction, or to disengage the power from the motor 20 and allow it to stop. The system can be modified to utilise an embodiment of the present invention by connecting a contactor K2 in parallel to the switch K1. The switch K2 can be engaged to direct the motor 20 into a reverse direction.

Also added to the existing configuration, downstream of the switches K1 and K2 and upstream of the motor 20, is a current sensor 22 to monitor the current being supplied to the motor 20. The current sensor is connected to a control system 30.

The control system 30 has an input interface 32, an output interface 34 and a power supply 36. The input signals are received and processed by the input interface 32 and the appropriate outputs are activated, as described above with respect to FIG. 1. The outputs Q1 and Q2 from the output interface 34 control the contactors K1 and K2 which in turn control the motor 20.

The existing coil connection to the contactor K1 is rerouted to the deragger control system 30 by the use of an interposing relay. This provides the run signal. From there the deragger takes control of the pump 20.

When monitoring the pump current, the device may be activated at programmable set points. Moreover the pump may be customisable by the user.

Improvements and modifications may be made without departing from the scope of the invention. For example applications may be added to the control device, such as to use the pump more intensively during the night to, or to use the pump for odour control.

What is claimed is:

1. A pump apparatus comprising:
   a mechanically switched constant speed wastewater pump; and
   a primary controller for the mechanically switched constant speed wastewater pump comprising:
      an electric current sensor measuring electric current drawn by a motor of the mechanically switched constant speed wastewater pump, and
      a switch control in communication with at least one switch, the at least one switch being in communication with the motor, and configured to control a direction of the motor among three conditions selected from the group consisting of: (i) stop, (ii) a constant-speed forward direction, and (iii) a constant-speed reverse direction;
   wherein when the electric current sensor detects that the current is above a pre-determined value, the switch control is adapted to control the pump to complete a series of cycles, each cycle comprising (a) stopping by stopping power to the pump and allowing it to coast to a rest, (b) operating in the constant-speed reverse direction, (c) stopping by stopping power to the pump and allowing it to coast to a rest, and (d) operating in the constant-speed forward direction, with a user-adjustable stopping period between direction changes;
   and wherein, while the number of cycles is less than or equal to a pre-determined maximum number of cycles, the switch control is further adapted to direct the pump into the series of cycles until the current detected by the electric current sensor is below a further pre-determined value.

2. The pump apparatus as claimed in claim 1, wherein each constant-speed forward and reverse direction in the cycle lasts for a time period which may be set and varied by a user.

3. The pump apparatus as claimed in claim 1, wherein the electric current sensor measures the output of the mechanically switched constant speed wastewater pump by measuring the current at which the motor of the mechanically switched constant speed pump is operating.

4. The pump apparatus as claimed in claim 1, wherein the electric current sensor is adapted to monitor electric current drawn by the mechanically switched constant speed wastewater pump, indicative of the torque of the motor, with regard to potential overloading of the mechanically switched constant speed pump.

5. The pump apparatus as claimed in claim 4, wherein the electric current sensor is provided as part of a common device.

6. The pump apparatus as claimed in claim 1, wherein the switch control is adapted to control the mechanically switched constant speed wastewater pump or another device in response to the current rising above a pre-determined value, which is indicative of the mechanically switched constant speed wastewater pump overloading or being in danger of overloading.

7. The pump apparatus as claimed in claim 1, wherein upon start-up, the motor of the mechanically switched constant speed wastewater pump is adapted to proceed through a cycle.

8. The pump apparatus as claimed in claim 1, wherein the motor of the mechanically switched constant speed wastewater pump starts at full power, without a restriction in the power.

9. The pump apparatus as claimed in claim 1, wherein the electric current sensor is configured to detect any sudden change in the current drawn by the motor, and the switch control is adapted to respond to such an event.

10. The pump apparatus as claimed in claim 1, which fits within a volume no greater than about 50 cm3.

11. The pump apparatus as claimed in claim 1, wherein the mechanically switched constant speed wastewater pump has a power rating ranging from about 1 KW to about 25 KW.

12. The pump apparatus as claimed in claim 11, wherein the mechanically switched constant speed wastewater pump has a power rating ranging from about 1 KW to about 9 kW.

13. The pump apparatus as claimed in claim 1, comprising a thermal stability monitor to monitor, directly or indirectly, thermal stability of the mechanically switched constant speed wastewater pump, wherein the electric current sensor and the thermal stability monitor are provided as part of a common device.

14. The pump apparatus as claimed in claim 1, wherein the constant-speed forward direction and the constant-speed reverse direction each lasts for about 3 second to about 20 seconds.

15. The pump apparatus as claimed in claim 1, wherein the mechanically switched constant speed wastewater pump does not include an inverter.

16. A retrofitting wastewater pump kit comprising:
   a controller for a mechanically switched constant speed wastewater pump comprising:
      an electric current sensor measuring electric current drawn by a motor of the mechanically switched constant speed wastewater pump, and
      a switch control in communication with at least one switch, the at least one switch being in communication with the motor, to control a direction of the motor among three conditions consisting of: (i) stop, (ii) a constant-speed forward direction, and (iii) a constant-speed reverse direction;
   wherein when the electric current sensor detects that the current is above a pre-determined value, the switch control is adapted to control the pump to complete a series of cycles, each cycle comprising (a) stopping by stopping power to the pump and allowing it to coast to a rest, (b) operating in the constant-speed reverse direction, (c) stopping by stopping power to the pump and allowing it to coast to a rest, and (d) operating in the constant-speed forward direction, with a user-adjustable stopping period between direction changes;
   and wherein, while the number of cycles is less than or equal to a pre-determined maximum number of cycles, the switch control is further adapted to direct the pump into the series of cycles until the current detected by the electric current sensor is below a further pre-determined value.

17. A method of operating a mechanically switched constant speed wastewater pump, comprising:
   monitoring the current of a motor of the mechanically switched constant speed wastewater pump while operating in a constant-speed forward direction to detect whether the current exceeds a predetermined value;
   controlling a direction of the motor among three conditions consisting of: (i) stop, (ii) the constant-speed forward direction, and (iii) a constant-speed reverse direction;
   cycling, upon detecting that the current exceeds the pre-determined value, the mechanically switched constant speed wastewater pump through a cycle comprising (a) stopping by stopping power to the pump and allowing it to coast to a rest, (b) operating in the constant-speed reverse direction, (c) stopping by stopping power to the pump and allowing it to coast to a rest, and (d) operating in the constant-speed forward direction, with a user-adjustable stopping period between direction changes; and
   cycling the pump through a series of cycles that is less than or equal to a pre-determined maximum number of cycles until the current detected by the electric current sensor is below a further pre-determined value.

\* \* \* \* \*